M. C. SHEA.
WHEEL HUB.
APPLICATION FILED OCT. 15, 1910.
987,090.
Patented Mar. 14, 1911.
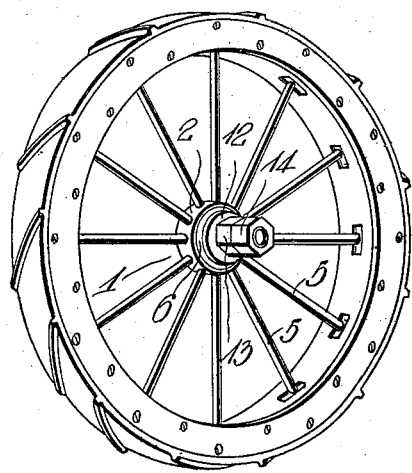
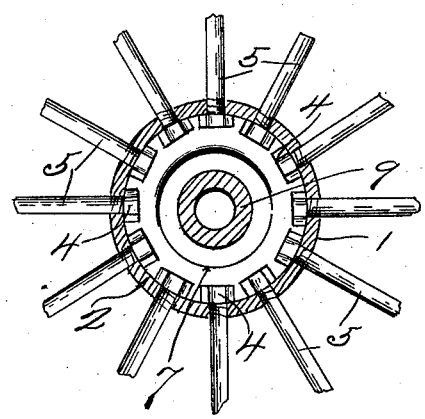
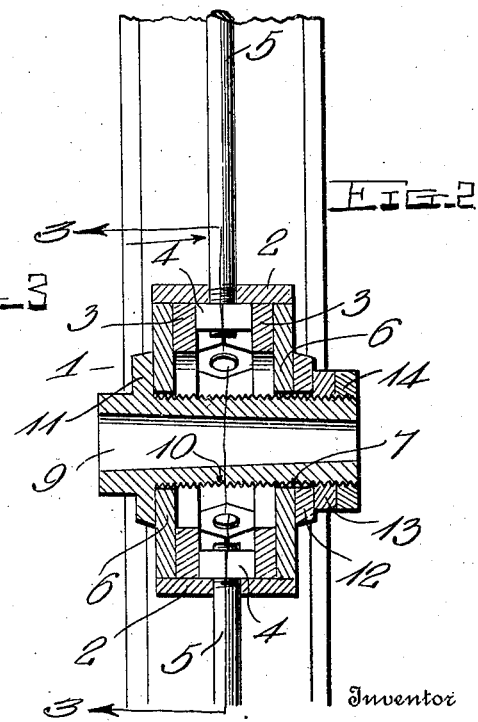
Witnesses
Inventor
M. C. Shea
By D. Swift &c.
Attorneys

UNITED STATES PATENT OFFICE.

MICHAEL C. SHEA, OF MISHAWAKA, INDIANA.

WHEEL-HUB.

987,090.  Specification of Letters Patent.  Patented Mar. 14, 1911.

Original application filed May 5, 1910, Serial No. 559,639. Divided and this application filed October 15, 1910. Serial No. 587,355.

*To all whom it may concern:*

Be it known that I, MICHAEL C. SHEA, a citizen of the United States, residing at Mishawaka, in the county of St. Joseph and State of Indiana, have invented a new and useful Wheel-Hub; and I do hereby declare the following to be a full, clear, and exact description of the invention, such as will enable others skilled in the art to which it appertains to make and use the same.

The invention relates to an improvement in wheels and has for its object to improve the construction of wheels that have a yieldable tread.

The novelty of this invention resides in the hub.

This application is the result of a division required in my application filed May 5, 1910, Serial No. 559,639 wherein a division was required between the claims on the resilient rim and those relating to the hub.

In the drawings, Figure 1 is a perspective view of a wheel constructed in accordance with this invention. Fig. 2 is a sectional view of a wheel constructed in accordance with this invention taken through the hub and the rim. Fig. 3 is a sectional view on line 3—3 of Fig. 2.

It is to be understood, however, that the invention hereinafter set forth may be applied to any form of rim to which it is applicable.

Referring to the drawings, 1 designates the outer portion of a hub which consists of an annular band or member 2 on the inner circumference of which two annular collars or rings 3 are disposed. These rings or collars are held spaced apart by means of nuts 4 which are threaded on the inner ends of the spokes 5. These spokes are threaded into the annular band. Also fitted within the annular band from each side thereof are annular plates 6 which are apertured, as shown at 7, and extending through the apertures is a sleeve or bushing 9 which is also provided with threads 10. This bushing or sleeve at one end is provided with a head 11, and at the other end a washer and nut 12 and 13 are threaded. Also threaded to the end of the bushing or sleeve is a lock nut 14 which holds the parts firmly together.

Having thus described the invention, what is claimed as new is:—

A wheel hub comprising an annular band having spokes and provided with a single row of apertures arranged annularly about the band to receive the spokes, said spokes having threaded ends threaded in the apertures, nuts threaded upon the extremities of the threaded ends of the spokes adjacent the inner circumference of the band annular rings fitted telescopically within the band against the flat faces of the nuts, one upon each side thereof, annular plates fitted telescopically within the band adjacent the rings and arranged flush with the annular edges of the band, a bushing exteriorly threaded and provided with an annular flange at one end penetrating the annular plates, means threaded to the exterior thread of the bushing at the end opposite the annular flange, for anchoring the bushing in place, and a washer located between the means and one of the plates, as specified.

In testimony whereof I have signed my name to this specification in the presence of two subscribing witnesses.

MICHAEL C. SHEA.

Witnesses:
L. A. ETTER,
J. W. HUTCHINSON.

Copies of this patent may be obtained for five cents each, by addressing the "Commissioner of Patents, Washington, D. C."